UNITED STATES PATENT OFFICE.

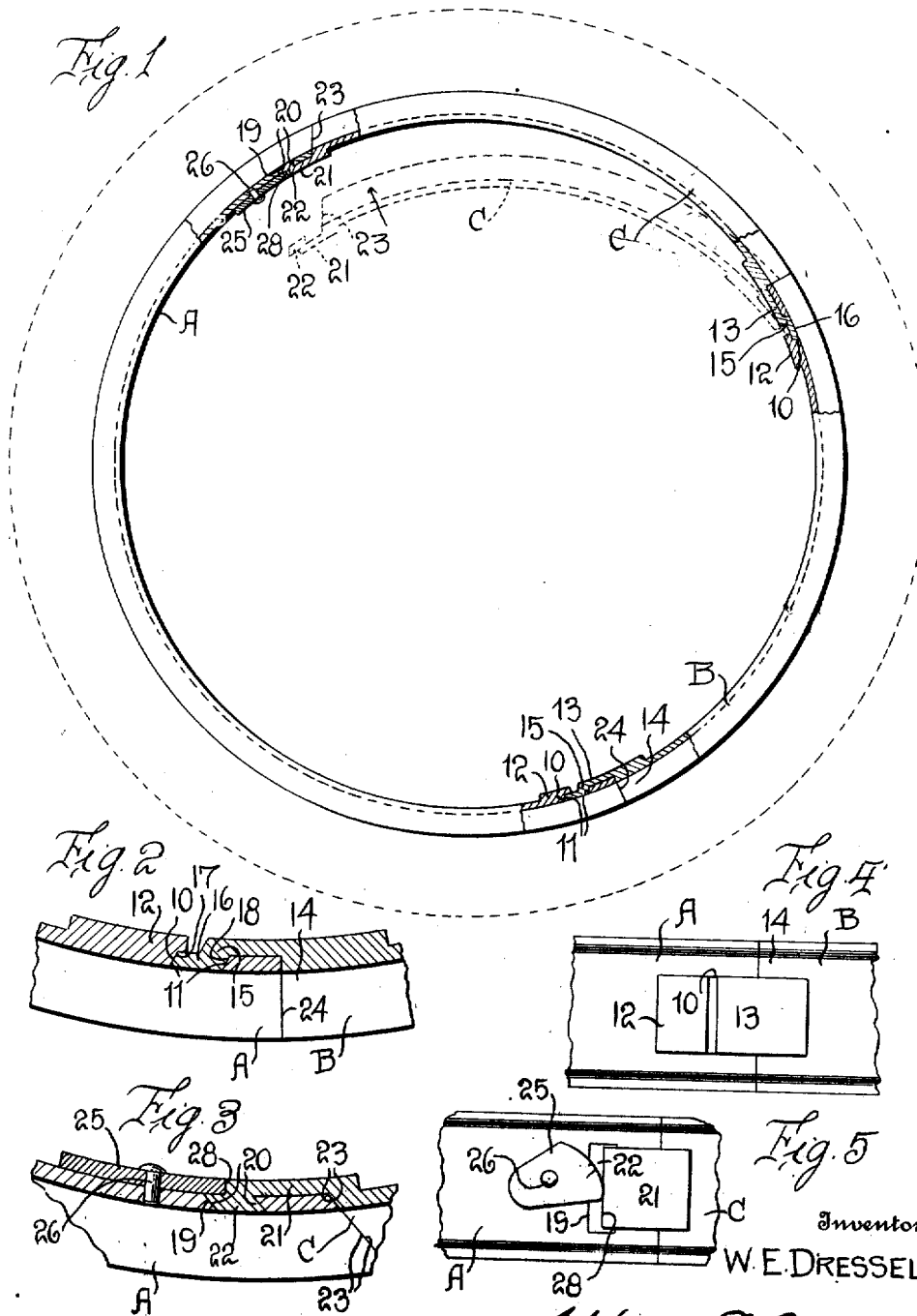

WARREN E. DRESSEL, OF EDWARDSVILLE, ILLINOIS, ASSIGNOR TO THE IDEAL COLLAPSIBLE RIM COMPANY, OF EDWARDSVILLE, ILLINOIS, A CORPORATION.

COLLAPSIBLE RIM FOR PNEUMATIC TIRES.

1,264,622.  Specification of Letters Patent.  Patented Apr. 30, 1918.

Application filed February 5, 1917. Serial No. 146,794.

*To all whom it may concern:*

Be it known that WARREN E. DRESSEL, a citizen of the United States, residing at Edwardsville, in the county of Madison and State of Illinois, has invented certain new and useful Improvements in Collapsible Rims for Pneumatic Tires, of which the following is a specification, reference being had to the accompanying drawings.

This invention relates to rims for pneumatic tires, and particularly such rims as are used for quick detachable tires, and the general object of the invention is to provide a rim of this nature constructed of a plurality of sections, so connected to each other that the sections may be collapsed and thus detached from within a pneumatic tire or forced outward into engagement with the tire and held in this position.

A further object of the invention is the provision of a rim of this character made up of sections, all of the sections having detachable interlocking engagement with each other, the sections having abutting engagement with each other when in place and two of the sections being provided with coacting means for locking the sections in their engaged and operative position.

A further object of the invention is to provide a very simple, cheaply constructed and readily operated rim of this character in which the sections shall be positively locked when in position, so that they cannot become accidentally unlocked and detached and in which means are provided for wedging the sections into interlocking engagement with each other.

Other objects will appear in the course of the following description.

My invention is illustrated in the accompanying drawings, in which:

Figure 1 is a side elevation of a collapsible rim constructed in accordance with my invention and partly in section, the view showing, in dotted lines, one section of the rim displaced from its normal position;

Fig. 2 is a fragmentary enlarged longitudinal section of the means for joining the section B to the section A;

Fig. 3 is a longitudinal fragmentary section of the means for joining the section A to the section C;

Fig. 4 is a top plan view of the construction shown in Fig. 2; and

Fig. 5 is a top plan view of the construction shown in Fig. 3.

Referring to these figures, it will be seen that my improved collapsible rim comprises three sections, A, B and C, section C being relatively short in comparison with the sections A and B.

The section A at one end is formed with a transversely extending slot 10, the slot having parallel beveled walls 11, and extending any desired distance across the rim. Preferably one wall of the slot is increased in thickness by thickening the rim section at this point, as at 12, this thickening being accomplished either by riveting or otherwise attaching a separate piece to the rim section, or by forming this thickened portion integrally with the rim section.

The next adjacent section B at its end, which conjoins with the section A, is formed, as illustrated in Fig. 2 with a tongue 13 having the same width as the slot 10, this tongue projecting beyond the end 14 of the rim section B and the tongue being either attached to or formed integral with the rim section B. The extremity of the tongue is deflected outward, as at 15, and then forward as at 16. This portion 16 is beveled upon one face, as at 17, so as to fit against the beveled face 11 of the wall or slot 10 and the inferior face or surface of the portion 16 is beveled as at 18, so as to fit against the beveled face 11 on the opposite wall of the slot 10. Thus the two faces 17 and 18 are parallel to each other and preferably have an angle of about 20 degrees. Preferably the thickened portion 12 projects slightly beyond the face of the adjacent wall 11, so that when the deflected end of the tongue 13 is fitted within the slot 10, the outer face of the portion 16 will bear against this slightly projecting edge of the thickened portion 12, as will be seen in Fig. 2.

The opposite ends of the section B are also provided with a slot 10, having the beveled wall 11 and the thickened portion 12, as heretofore described, and the adjacent end of the section C, which is the locking section, is formed with a tongue 13, a deflected portion 15 and 16, these deflected portions 15 and 16 being formed with the beveled faces 17 and 18, as heretofore described, so that the section C interlocks with the section B, in exactly the same manner as the section B interlocks with the section A.

The confronting ends of the sections A and C are formed as follows and as illustrated in Fig. 3. The section A is formed with a slot 19 corresponding in a way to the slot 10, but the opposite walls 20 of this slot are beveled reversely to the walls 11 of the slot 10 and are at an angle of about 10 degrees. The section C has formed on it or attached to it, a tongue 21, which tongue is disposed inward of the body of the section and the extremity of this tongue is provided with an outwardly and longitudinally extending locking lug 22 and adapted to be inserted in the slot 19, the opposite edge faces of this locking lug 2 being beveled at an angle of about 10 degrees to correspond with the bevel of the slot 19. The abutting ends of the sections A and C are beveled, as at 23, this bevel being parallel to the beveled faces 20 of the slot 19 and being at an angle of about 10 degrees, while the abutting ends of the sections A and B and of the section B with C are radial, these radial ends being designated 24. Pivotally mounted upon the inner face of the section A is a locking cam 25 which is illustrated as pivoted upon a pin, or like member 26, the face of this locking cam being concentric to this pivot pin, as at 27, so that as the locking cam is turned from its inoperative to its operative position, it will not only extend over the upper face of the longitudinally projecting lug 22, but will bear against the end face 28 of the tongue 21 and thereby lock the lug 22 firmly in place in the inclined slot 19.

To apply the rim, made as described, to a tire, the section A is laid in the tire and then the section B is laid within the tire and connected with the section A, and then the section C is connected to the section B and the locking lug 22 is disposed in the slot 19 of the section A and the locking cam 25 is turned so as to lock the parts together, thus locking the three sections from disengagement and holding these three sections firmly in place within the tire.

While I have illustrated a rim composed of three sections, I wish it understood that there might be more sections than three. To remove the rim from the tire, the reverse operation is performed and the section C is unlocked from its engagement with section B and then removed, whereby the other sections may be readily removed.

It will be obvious that it is very easy to apply this collapsible rim to a new tire, or to a tire which would ordinarily be so tight as would make it difficult to apply the usual rim. Furthermore, it will not be necessary to use tire tools for the purpose of forcing the tire onto a rim and thus a saving in tires will be effected. Furthermore, it is often the case that a tire rusts on a rim and in that case it is extremely difficult to force the tire off of the rim, whereas no difficulty of this kind is experienced with my collapsible rim.

The reason for having the faces 17 and 18 of the tongue 16 at an angle is so that the tongue will draw from its seat when the section is forced inward and by actual experiment I find that the angle of 20° is particularly advantageous. The angular faces 20 of the slot 19 are beveled at an angle of about 10°, that is, the same angle at which the rim is cut, as at 23, and thereby when the rim is broken at this point to remove the rim from the tire, the tendency will be to retract to a smaller circle and this angle of the faces 20 permits the rim to be separated readily and when the rim is replaced within the tire, the key and rim receive equal pressure when the tire is inflated. Another function of the cam 25 is to hold the key or lug 22 to its seat when the tire is deflated as for instance when the tire is punctured. Without this locking cam 25 there would be danger that the rim might jar apart with the rim deflated and fall from the tire. While I have illustrated the sections B and C of the rim as being shorter than the section A, it is to be understood that they might all be of the same size.

I do not wish to limit myself to any particular formation of the rim for engagement with the tire, as the means whereby the rim may be collapsed or the rim sections held in engagement with each other may be applied equally well either to a straight sided tire or a tire of the clencher type.

Having thus described my invention, what I claim is:—

1. A collapsible rim for pneumatic tires, comprising a plurality of arcuate rim sections abutting against each other when in place within a tire, each section having at one end a transversely extending slot and at the other end a tongue adapted to extend over the end of the adjacent rim section, a slot at the end of one of said sections having parallel walls beveled outward and toward the adjacent end of that section, and the tongue of the adjacent coacting section having a locking lug disposed on its outer face and having outwardly beveled walls parallel to the walls of the coacting slot, the slotted section at its end being provided with a pivoted cam adapted to engage over the lug of the next adjacent section and bear against the end of the tongue, the other sections of the rim being formed with slots and interlocking tongues at their adjacent ends whereby to detachably connect the sections with each other.

2. A collapsible rim for pneumatic tires comprising a plurality of arcuate rim sections abutting against each other when in place within the tire, each of said sections being formed at one end with a transversely extending slot having parallel beveled walls and at the other end with a tongue having a deflected portion adapted to engage in the corresponding slot, the end faces of said tongue being beveled to correspond to the beveled walls of the slot and interlockingly engage therewith.

In testimony whereof I hereunto affix my signature in the presence of two witnesses.

WARREN E. DRESSEL.

Witnesses:
 WM. H. KROME,
 A. T. WOLF.